US012667897B2

(12) United States Patent (10) Patent No.: US 12,667,897 B2
Kopton (45) Date of Patent: Jun. 30, 2026

(54) METHOD FOR PRODUCING A WORKPIECE THREADED HOLE

(71) Applicant: AUDI AG, Ingolstadt (DE)

(72) Inventor: Peter Kopton, Kösching (DE)

(73) Assignee: AUDI AG, Ingolstadt (DE)

( * ) Notice: Subject to any disclaimer, the term of this patent is extended or adjusted under 35 U.S.C. 154(b) by 982 days.

(21) Appl. No.: 17/798,157

(22) PCT Filed: Feb. 10, 2021

(86) PCT No.: PCT/EP2021/053188
§ 371 (c)(1),
(2) Date: Aug. 8, 2022

(87) PCT Pub. No.: WO2021/197696
PCT Pub. Date: Oct. 7, 2021

(65) Prior Publication Data
US 2023/0094117 A1 Mar. 30, 2023

(30) Foreign Application Priority Data
Apr. 1, 2020 (DE) .......................... 102020109035.8

(51) Int. Cl.
*B23G 5/18* (2006.01)
*B23G 1/32* (2006.01)
(52) U.S. Cl.
CPC .............. *B23G 5/184* (2013.01); *B23G 1/32* (2013.01); *B23G 2200/143* (2013.01); *B23G 2240/36* (2013.01)
(58) Field of Classification Search
CPC . B23G 1/32; B23G 5/184; B23G 5/20; B23G 2200/143; B23G 2240/36
See application file for complete search history.

(56) References Cited

U.S. PATENT DOCUMENTS 5,413,438 A 5/1995 Turchan
5,429,459 A * 7/1995 Palm ................. B23Q 11/0042
408/222

(Continued)

FOREIGN PATENT DOCUMENTS

DE 3810884 C1 9/1989
DE 3876820 T2 5/1993

(Continued)

OTHER PUBLICATIONS

Office Action issued on Mar. 27, 2025, in corresponding Chinese Application No. 202180022508.X, 14 pages.

(Continued)

*Primary Examiner* — Eric A. Gates
(74) *Attorney, Agent, or Firm* — Maier & Maier, PLLC

(57) ABSTRACT

A method for producing a workpiece threaded hole by a tapping tool, with a drilling stroke, in which the rotating tapping tool is driven into the workpiece in a drilling direction to a nominal drilling depth, and so forming a thread-free pilot hole, and with a tap-ping stroke in which the tapping tool produces an internal thread in the pilot hole with a tapping feed rate and a tapping speed synchronized therewith. The drilling stroke is followed by a reversing stroke in which the tapping tool is guided out of the pilot hole in a reversing direction opposite to the drilling direc-tion. The tapping tool is then radially displaced by a radial offset in an offset stroke. Then, in the tapping stroke, the radially controlled, rotating tapping tool is guided in a circular rotary motion along a circular path around the hole axis.

16 Claims, 11 Drawing Sheets

(56) References Cited

U.S. PATENT DOCUMENTS

| | | | | |
|---|---|---|---|---|
| 6,231,281 B1 * | 5/2001 | Nishikawa | ............. | B23G 5/184 |
| | | | | 408/222 |
| 6,663,326 B1 * | 12/2003 | Hiroyasu | ................ | B23B 27/18 |
| | | | | 407/29 |
| 8,407,891 B2 * | 4/2013 | Owusu | ................... | B23G 5/184 |
| | | | | 29/527.1 |

FOREIGN PATENT DOCUMENTS

| | | | | | |
|---|---|---|---|---|---|
| DE | 3627798 | C2 | 9/1995 | | |
| DE | 202005012562 | U1 * | 11/2005 | ............ | B23G 5/188 |
| DE | 102012105183 | A1 | 12/2013 | | |
| DE | 102017007419 | A1 | 2/2019 | | |
| DE | 102018115986 | A1 | 1/2020 | | |
| EP | 1497067 | B1 | 1/2007 | | |
| EP | 2399700 | A1 | 12/2011 | | |
| EP | 3484647 | B1 | 10/2019 | | |
| JP | H01502012 | A | 7/1989 | | |
| JP | 2001113407 | A | 4/2001 | | |
| WO | 8805361 | A1 | 7/1988 | | |
| WO | 2018028810 | A1 | 2/2018 | | |
| WO | 2019029850 | A1 | 2/2019 | | |
| WO | 2019206583 | A1 | 10/2019 | | |
| WO | 2021043488 | A1 | 3/2021 | | |

OTHER PUBLICATIONS

Examination Report issued on Oct. 2, 2020, in connection with corresponding German Application No. 10 2020 109 035.8 (8 pp., including machine-generated English translation).

International Search Report with English translation issued on May 19, 2021, in corresponding International Application No. PCT/EP2021/053188; 5 pages.

International Preliminary Report on Patentability with English translation and Written Opinion with English Translation Issued on Sep. 29, 2022, in corresponding International Application No. PCT/EP2021/053188; 14 pages.

Office Action issued on Nov. 7, 2023, in corresponding Japanese Application No. 2022-558543, 7 pages.

Office Action issued on Dec. 19, 2023, in corresponding Japanese Application No. 2022-558543, 16 pages.

Office Action issued on Nov. 12, 2025, in corresponding European Application No. 21 704 523.6, 14 pages.

* cited by examiner

Section A-A $t(n_w) = t(n_G)$

State of the art

State of the art

<u>Fig. 13</u>
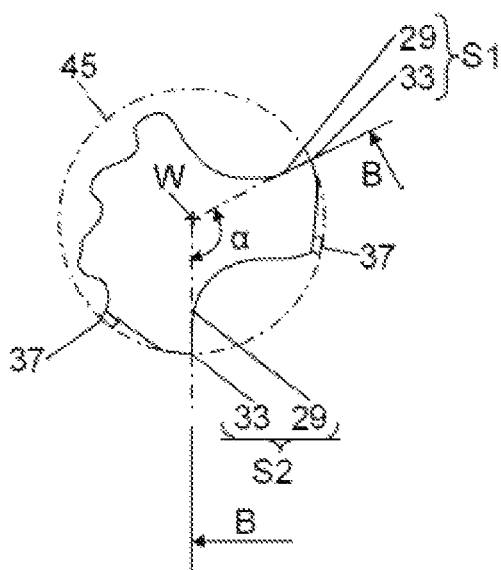
<u>Fig. 14</u>
<u>Section B-B</u>
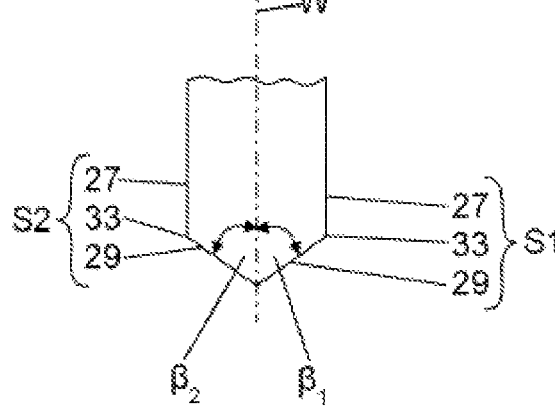

Section B-B

METHOD FOR PRODUCING A WORKPIECE THREADED HOLE

FIELD

The invention relates to a method for producing a workpiece threaded hole and to a tapping tool.

BACKGROUND

In a method of the type described, the workpiece threaded hole is first produced by a drilling stroke in which the rotating tapping tool is driven into the non-pre-drilled workpiece in a drilling direction to a nominal drilling depth, forming a thread-free pilot hole. In addition, a tapping stroke is performed in the method, in which the tapping tool produces an internal thread in the pilot hole with a tapping feed rate and a tapping speed synchronized with it.

For example, the method can be implemented as a so-called single-shot tapping process, in which both the pilot hole (i.e. core drilling) and an internal thread generation are performed in a common tool stroke. In this case, the drilling stroke and the tapping stroke merge in time. This leads to a high tool load and possibly to a reduced tool life.

Such a single-shot tapping process is known from WO 2019/029850 A1. At the end of the tapping stroke, the direction of rotation of the rotating tool is reversed. The tool is then fed out of the threaded hole in the reversing stroke without load, at a reversing speed synchronized with the reversing feed, at which the tapping teeth of the tapping tool move in the threads of the workpiece threaded hole without load.

SUMMARY

The object of the invention is to provide a method for producing a workpiece threaded hole and a tapping tool in which the tool load is reduced compared to the prior art and the threaded hole can be produced in reduced process time.

In a departure from WO 2019/029850 A1 above, according to the invention both the pilot hole and the internal thread are no longer produced simultaneously in the drilling stroke, which is associated with a high tool load. In the invention, the tapping tool is designed in such a way that only the pilot hole is drilled during the drilling stroke. The internal thread is then produced in an independent tapping stroke. A reversing stroke takes place after the drilling stroke in preparation for the tapping stroke, in which the tapping tool is guided completely out of the pilot hole in a reversing direction opposite to the drilling direction. The tapping tool leading out of the pilot hole is steered radially outward by a radial offset in an offset stroke. The radially controlled tapping tool is then guided in a circular rotary motion along a circular path around the hole axis, whereupon the tapping stroke starts.

It should be emphasized that, according to the invention, the internal thread generation does not take place during the reversing stroke. In this case, a time-consuming speed adjustment of the tapping tool would have to be made in preparation for the internal thread generation, in which the tapping tool would have to be controlled from a drilling speed (from the previous drilling stroke) to a tapping speed (for the following internal thread generation). In addition, with such internal thread generation, the tapping tool would be subjected to a tensile force, which would reduce the tool's load capacity.

According to the invention, the tapping stroke and the drilling stroke can have an identical stroke direction. In the drilling stroke, the tool axis around which the tapping tool rotates and the hole axis can be coaxial to each other. In addition, during the drilling stroke, a drilling section of the tapping tool is in chip engagement with the workpiece, while a thread generating section is carried along without load.

In a preferred design variant, the tapping stroke can be extended by one free-cutting stroke when the nominal thread depth is reached. In the free-cutting stroke, the feed and the speed of the tapping tool are no longer synchronized with each other, creating a circumferential free-cutting groove adjacent to the internal thread without thread pitch. In the tapping stroke, the tool axis and the hole axis are axially parallel to each other, with a center distance that corresponds to the radial offset by which the tapping tool has been radially displaced in the offset stroke.

After the circumferential free-cutting groove is created during the free-cutting stroke, a second offset stroke can be performed. In the second offset stroke, the tapping tool is retracted by a radial offset in the radial direction from the internal thread or from the free-cutting groove. This enables the tapping tool to be guided out of the workpiece threaded hole in a subsequent reversing stroke without load, i.e. without thread engagement or chip engagement.

If necessary, the direction of rotation of the tapping tool can be reversed to prepare the tapping stroke. The reversal of the direction of rotation can take place, for example, during the execution of the first reversing stroke.

After the drilling stroke has been performed, the speed of the tapping tool can be braked to zero if necessary and the first reversing stroke can be started.

In the tapping stroke, tapping is performed by synchronous interpolation in an xy-plane around the center of the thread outer diameter $d_A$ and by simultaneous synchronous movement along the hole axis (or tool axis) at a feed rate of one pitch per revolution. The time for one revolution from the tapping tool ($n_W$) corresponds to the time for one revolution around the center of the thread outer diameter ($n_G$). The feed performed along the hole axis (tapping feed rate) during this time corresponds to the thread pitch.

In the first offset stroke (i.e. between the first reversing stroke and the tapping stroke), the rotating tapping tool is steered out by a radial offset and guided in a circular rotary motion along a circular path around the hole axis.

The tapping tool is designed in such a way that during the drilling stroke, one tool thread generating section (required for internal thread generation) remains load-free and out of engagement with the pilot hole wall. In the subsequent tapping stroke, on the other hand, the tool drilling section (required to produce the pilot hole) remains load-free and out of engagement with the internal thread produced. The tool drilling section moves radially within the radially inner thread crest of the internal thread with its drilling cutting edges in the tapping stroke. The tapping stroke is performed with the tool axis parallel to the hole axis.

The tapping tool has at least a first cutting edge and a second cutting edge, which are spaced from each other in the circumferential direction of the tool by a cutting edge angle. The cutting edge angle is dimensioned so that the two drilling cutting edges can be guided out of the workpiece threaded hole in the tapping stroke without load and out of engagement with the internal thread produced.

In one technical implementation, the thread generating section formed on the tapping tool is arranged in a tool circumferential direction outside the rotation angle range spanned by the two drilling cutting edges.

An outer cutting edge contour of the two drilling cutting edges moves on a drilling cutting edge circular path during tool rotation. Similarly, during tool rotation, a tooth contour of the tool thread generating section moves along a tooth contour circular path with a tooth contour diameter. In order to support an interference-free free-running cut of the tapping tool in the radial direction as well as the second reversing stroke, the tooth contour diameter is designed to be smaller than the cutting edge contour diameter. This results in a radial tool clearance between the drill cutting circular path and the tooth contour circular path. The tool clearance is partially used up in the radial direction during the free-running cut.

The cutting edge angle between the first cutting edge and the second cutting edge can be smaller than 180°, for example in the range of 120°.

Each of the drilling cutting edges can have at least one end transverse cutting edge formed on the tool tip. The transverse cutting edge of each drilling cutting edge can merge into a longitudinal cutting edge of the drilling cutting edge at a radially outer cutting edge corner. In addition, in a specific design variant, one drilling cutting edge can be formed on a drill web running in the longitudinal direction of the tool. The two drill webs can be spaced from each other in the tool circumferential direction by chip spaces. A chip surface bounding the chip space can merge (in the tool circumferential direction) at the longitudinal cutting edge into a circumferential drill web free surface. Guide chamfers can project radially outward from each of the two drill web free surfaces. In addition, the tool thread generating section may be formed on one of the two circumferential drill web free surfaces.

At the tool tip of the tapping tool, a chip surface bounding the chip space can merge at the end transverse cutting edge into an end free surface that tapers in the direction of the tool axis. It is preferable with regard to a uniform drilling cutting edge load if the first and second drilling cutting edges are arranged in different height positions in the tool axial direction, i.e. axially offset in height relative to each other. The axial height offset between the two drilling cutting edges (in particular their transverse cutting edges with associated cutting edge corner) can be dimensioned in such a way that the drilling cutting edge loads per drilling cutting edge are approximately equal in the drilling stroke. With axially vertically offset drilling cutting edges, an approximately uniform drilling cutting edge load can be achieved, despite the drilling cutting edges not being diametrically opposed with respect to the tool axis (as is the case in a conventional tapping tool), so that the tooth feed rate per drilling cutting edge is approximately the same. In particular, the two end transverse cutting edges of the drilling cutting edges can be offset in height relative to each other in the tool axial direction.

BRIEF DESCRIPTION OF THE FIGURES

An example of an embodiment of the invention is described below with reference to the accompanying figures. Showing:

FIG. 13 is another embodiment of the invention;

FIG. 14 is another embodiment of the invention;

DETAILED DESCRIPTION

Figure 1:
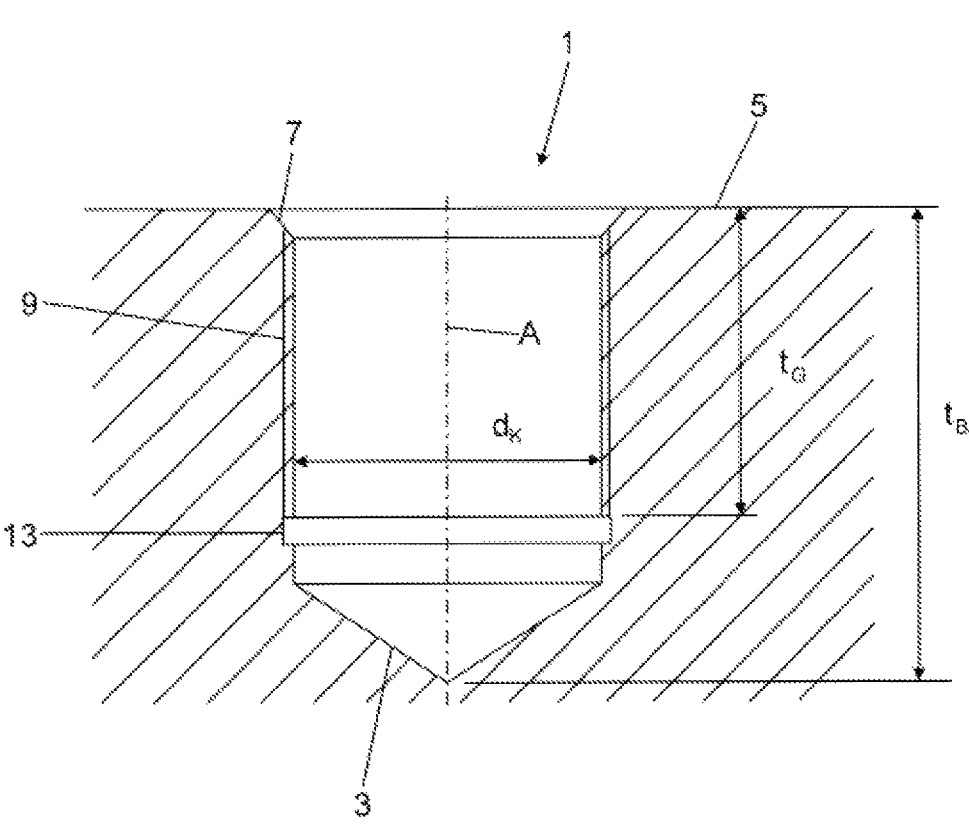
FIG. 1 in a side sectional view of a threaded blind hole formed in a workpiece.

FIG. 1 shows a completed threaded blind hole 1. The hole 1 is machined with its hole bottom 3 to a nominal drilling depth $t_B$ in a workpiece 5 by means of a process sequence which will be explained later with reference to FIGS. 4 to 8. The threaded hole 1 has a circumferential thread counterbore 7 at its hole opening, which in the further course merges downward into an internal thread 9. The internal thread 9 extends along the hole axis A to a usable nominal thread depth $t_G$. As can be seen from FIG. 1, one thread of the internal thread 9 opens into a circumferential clearance or free-cutting groove 13. The thread core of the internal thread 9 lies on a core hole diameter $d_K$ in FIG. 1. The thread bottom of the internal thread 9 lies on a thread outer diameter $d_4$.

Figures 2, 3:
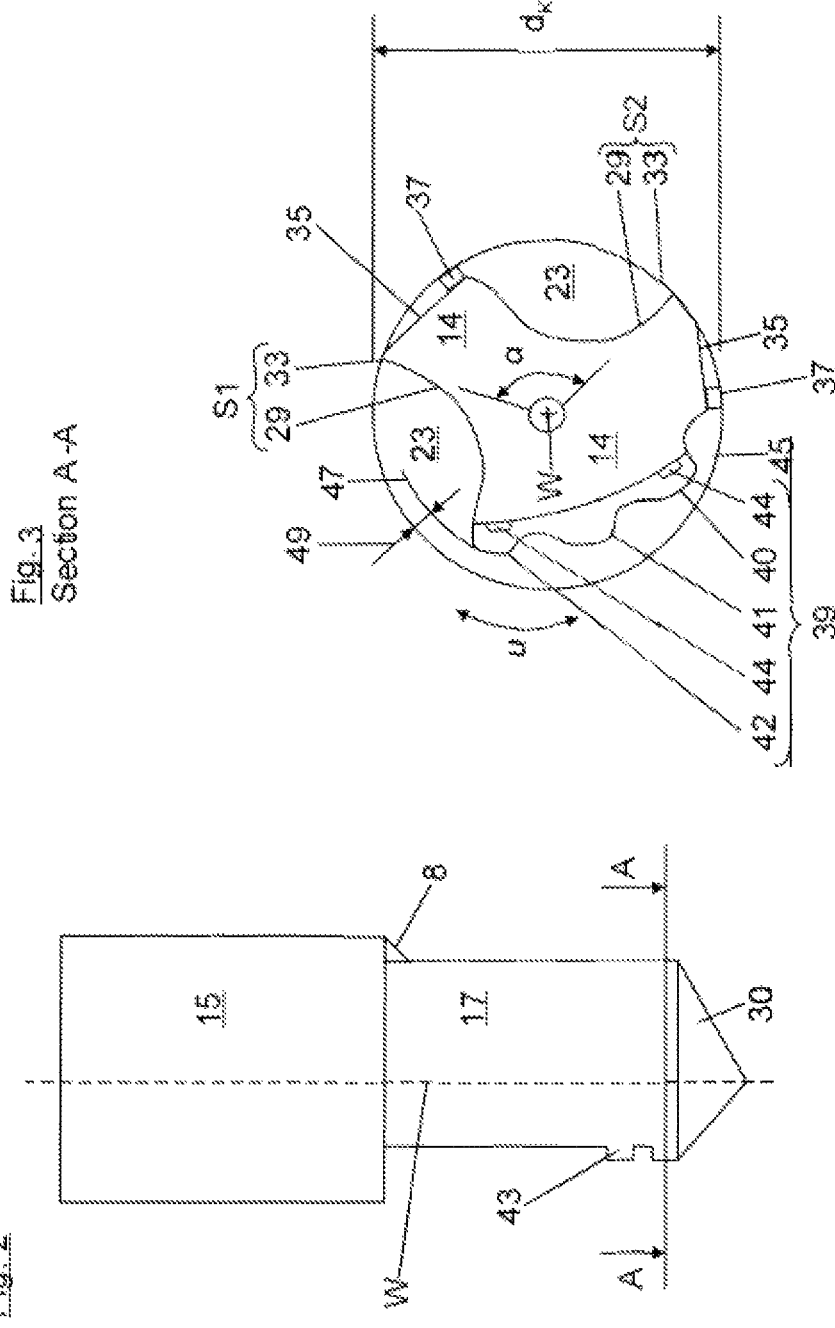
FIG. 2 is a view of a tapping tool.
FIG. 3 is a view of a tapping tool.
Figure 5:
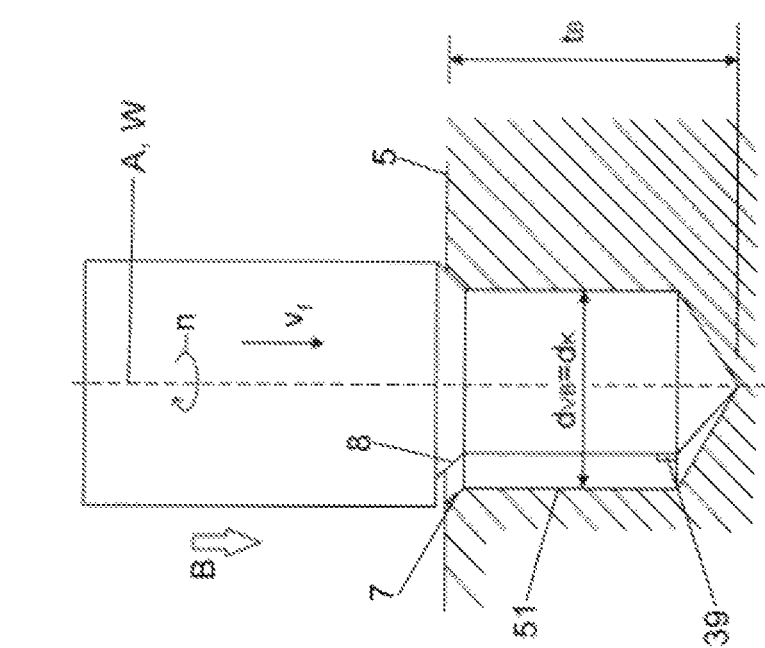
FIG. 5 is another view illustrating the production of the threaded blind hole shown in FIG. 1.

The threaded blind hole 1 shown in FIG. 1 is produced with the aid of a tapping tool described below with reference to FIGS. 2 and 3. Accordingly, the tool in FIG. 2 has a clamping shank 15 to which a tapping body 17 is connected. In FIG. 3, a first drilling cutting edge S1 and a second drilling cutting edge S2 are formed on the tapping body 17, which are spaced apart from each other in a tool circumferential direction u by a cutting edge angle α. In FIG. 3, the tapping tool has two drill webs 14 running in a longitudinal direction of the tool. A drilling cutting edge S1, S2 is formed on each of the two drill webs 14. The two drill webs 14 are spaced from each other in the tool circumferential direction u (FIG. 3) by chip spaces 23. Each of the drilling cutting edges S1, S2 has a longitudinal cutting edge 27 running in the longitudinal direction of the tool (only indicated in FIGS. 12 and 14) and an end transverse cutting edge 29 formed at the tool tip. The end transverse cutting edge 29 merges into the longitudinal cutting edge 27 at a radially outer cutting edge corner 33.

A chip surface bounding the chip space 23 merges at the longitudinal cutting edge 27 into a circumferential drill web free surface 35 (FIG. 3). Laterally projecting guide chamfers 37 are formed on each of the circumferential drill web free surfaces 35. In addition, a tool thread generating section 39 is formed on the wide drill web 14 (and specifically on its drill web free surface 35). In FIG. 3, this consists of a total of three machining teeth, namely a pre-machining tooth 40, an intermediate tooth 41 and a finishing tooth 42. Alternatively or additionally, further teeth (such as tooth 43 shown in FIG. 1) can be provided. In FIG. 3, the teeth 40 to 42 are arranged one behind the other in the tool circumferential direction u and are positioned at approximately the same height in the axial direction. Alternatively, however, the thread generating section 39 is not limited to this particular embodiment. Rather, fewer or more cutting teeth can also be provided and/or the cutting teeth can also be arranged axially offset from one another on the drill web free surfaces 35.

Figure 4:
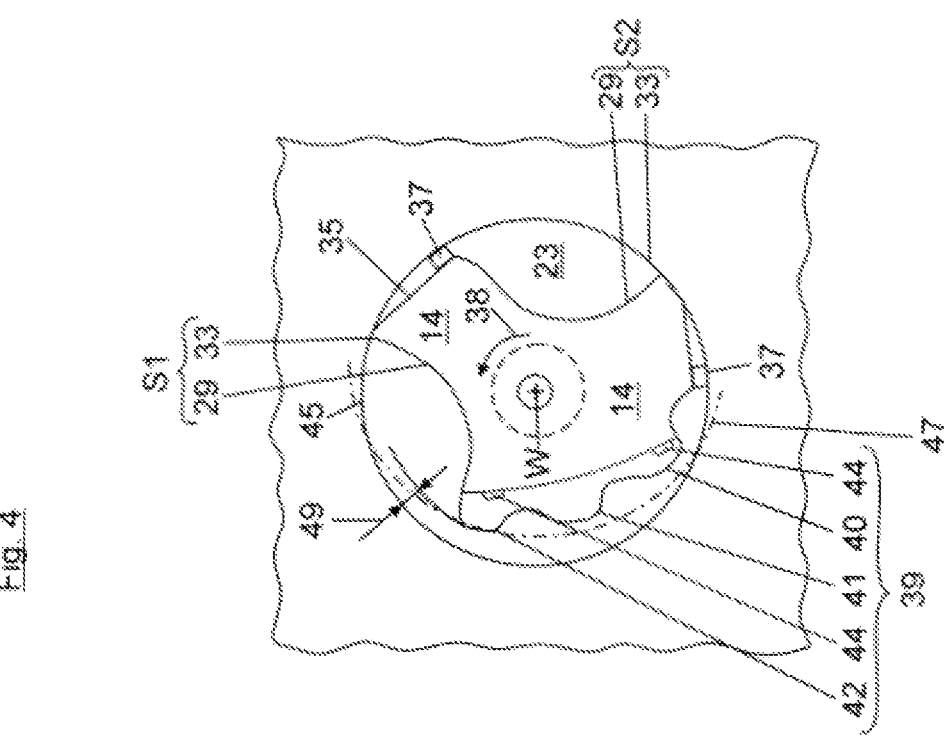
FIG. 4 is a view illustrating the production of the threaded blind hole shown in FIG. 1.

The thread generating section 39 also has, viewed in the axial direction, on both sides of the machining teeth 40, 41, 42 respectively a circumferential cylindrically extending support web 44 (FIGS. 3 and 4), the outer diameter of which lies approximately on the pilot hole diameter $d_{VB}$ during the thread generation (see FIG. 7), so that during the thread generation the support web (44) of the tapping tool is supported against the pilot hole wall As further shown in FIG. 3, an outer cutting edge contour of the first and second drilling cutting edges S1, S2 moves along a drilling cutting edge circular path 45 with a cutting edge contour diameter (identical to core hole diameter $d_K$) during a tool rotation. Similarly, a tooth contour of the tool thread generating section 39 moves along a tooth contour circular path or envelope curve 47 (FIGS. 3 and 4) with a tooth contour diameter during tool rotation. In FIG. 3 or 4, the tooth contour diameter is smaller than the cutting edge contour diameter (identical to core hole diameter $d_K$). This results in a radial tool clearance 49 (FIG. 3 or 4) between the drill cutting circular path 45 and the tooth contour circular path 47. The tool clearance 49 is required in a clearance step F (FIG. 8b) described later.

In the following, FIGS. 4 to 8 describe a thread generation using the tapping tool according to the invention: Thus, in a drilling stroke B (FIGS. 4 and 5), the rotating tapping tool is driven into the not yet predrilled workpiece 5 up to the nominal drilling depth $t_B$, forming a pilot hole 51. In the drilling stroke B, the two drilling cutting edges S1, S2 are in chip engagement with the workpiece 5, while the tool thread generating section 39 remains load-free as well as out of engagement with the pilot hole wall. The tool axis W is aligned coaxially to the hole axis A, the feed rate $v_f$ as well as the speed n of the tapping tool are freely selectable. In FIG. 4, the drilling process takes place in the direction of rotation 38 shown, for example, counterclockwise.

After the end of the drilling stroke (FIG. 5), the following process steps prepare the tapping stroke G (FIG. 8a): Thus, after the drilling stroke B, a first reversing stroke R1 (FIG. 6) takes place, in which the tapping tool is guided out of the pilot hole 51 in a reversing direction opposite to the drilling direction to such an extent that a first offset stroke V1 (FIG. 7) can take place. In the first offset stroke V1, the tapping tool leading out of the pilot hole 51 is radially displaced by a radial offset $\Delta r_1$.

Figure 7:
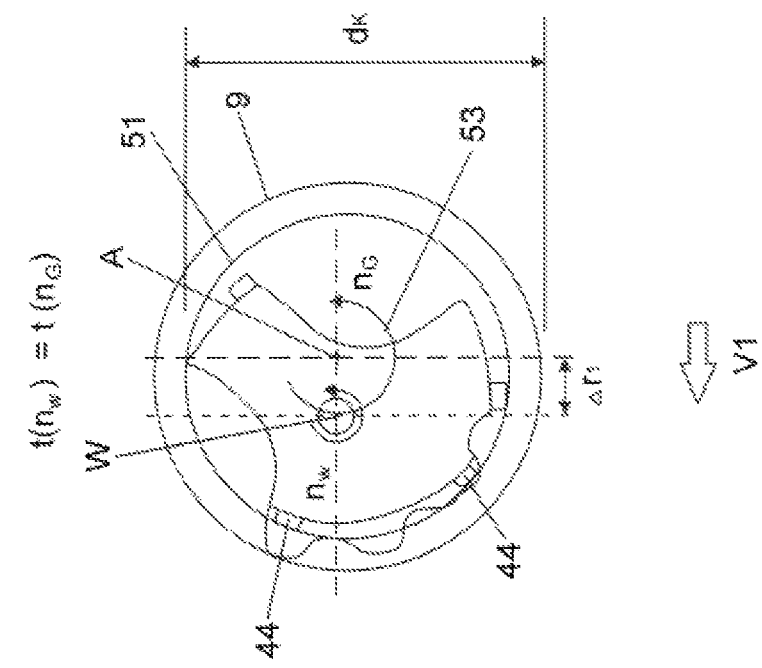
FIG. 7 is another view illustrating the production of the threaded blind hole shown in FIG. 1.
Figure 6:
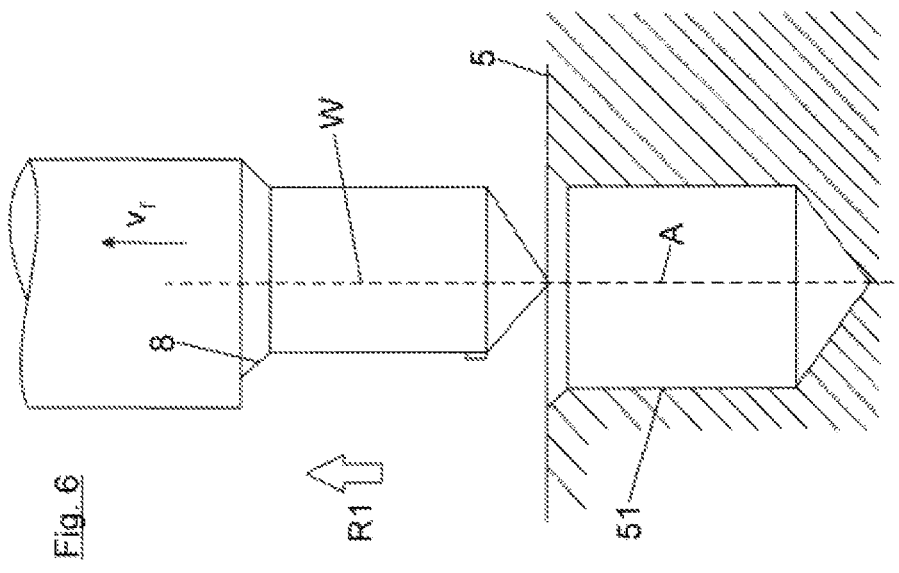
FIG. 6 is another view illustrating the production of the threaded blind hole shown in FIG. 1.

Then the tapping stroke (FIG. 8a) starts, in which the radially controlled, rotating tapping tool is guided in a circular rotary motion (FIG. 7) along a circular path 53 around the hole axis A and is inserted into the pilot hole 51 with a tapping feed rate and a tapping speed synchronized therewith. In the tapping stroke G, the tool rotation and the tool circular movement take place both in the same direction of rotation and at the same speed, as indicated in FIG. 7.

Figure 8A:
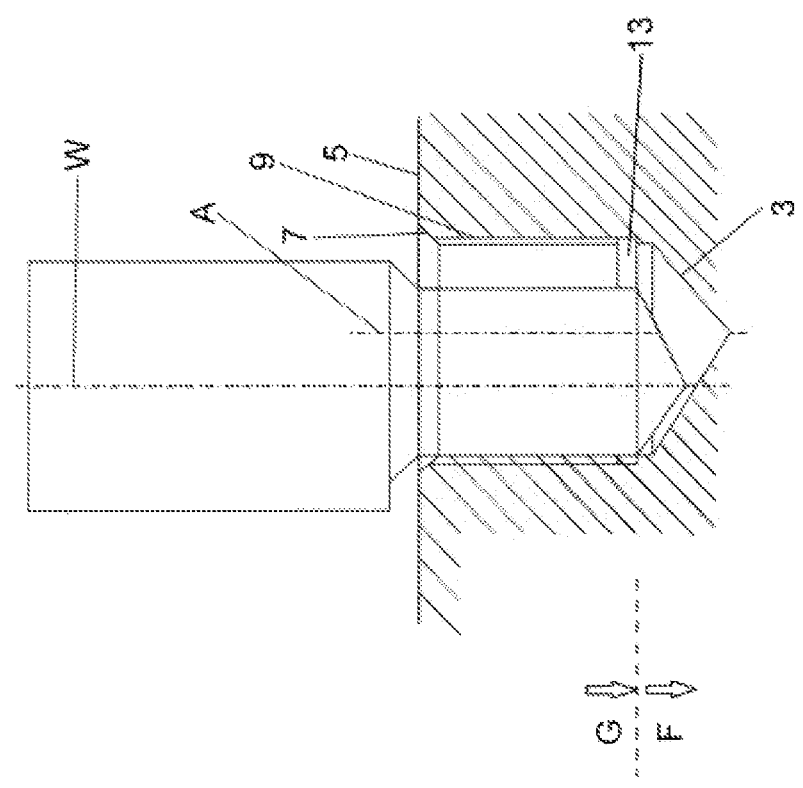
FIG. 8 is another view illustrating the production of the threaded blind hole shown in FIG. 1.
Figure 8B:
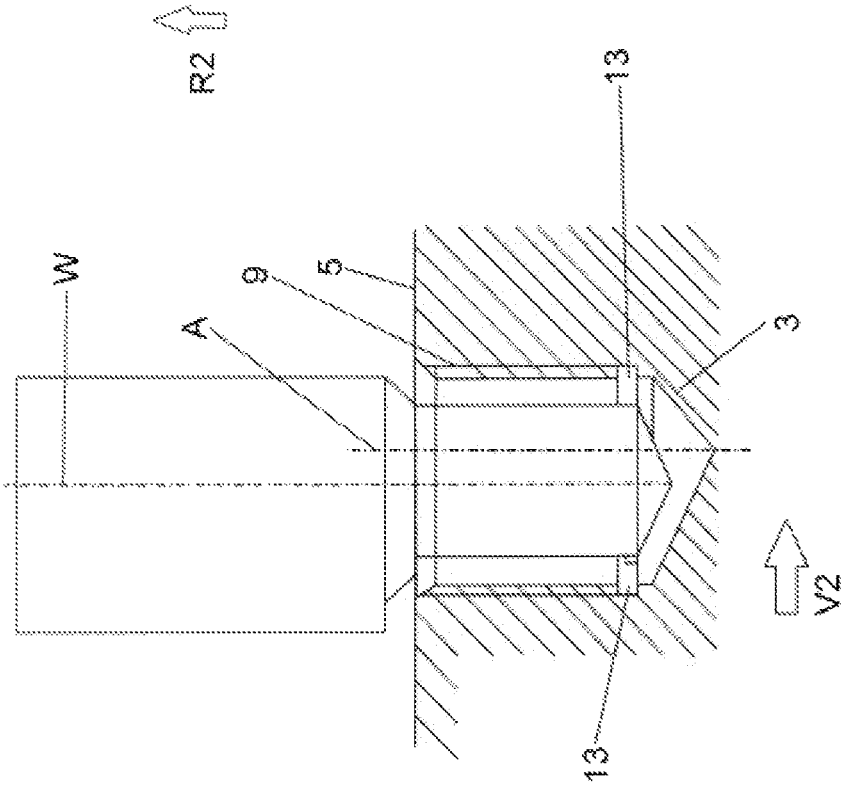

In the tapping stroke G (FIG. 8a), the thread generating section 39 of the tapping tool produces the internal thread 9 until the nominal thread depth $t_G$ is reached. When the nominal thread depth $t_G$ is reached, the tapping stroke G is extended by a free-cutting stroke F (FIG. 8a). In the free-cutting stroke F, the feed rate $v_f$ and the speed n of the tapping tool are no longer synchronized with each other.

Therefore, the circumferential free-cutting groove 13 adjacent to the internal thread 9 is created without thread pitch.

After the circumferential free-cutting groove 13 has been created, a second offset stroke V2 follows (FIG. 8b), during which the tapping tool is moved clear of the free-cutting groove 13 by a radial offset $\Delta r_2$ in the radial direction. This enables a second reversing stroke R2 (FIG. 8b), in which the tapping tool can be guided out of the workpiece threaded hole 1 without load, i.e. without thread engagement and without chip engagement.

Figure 9:
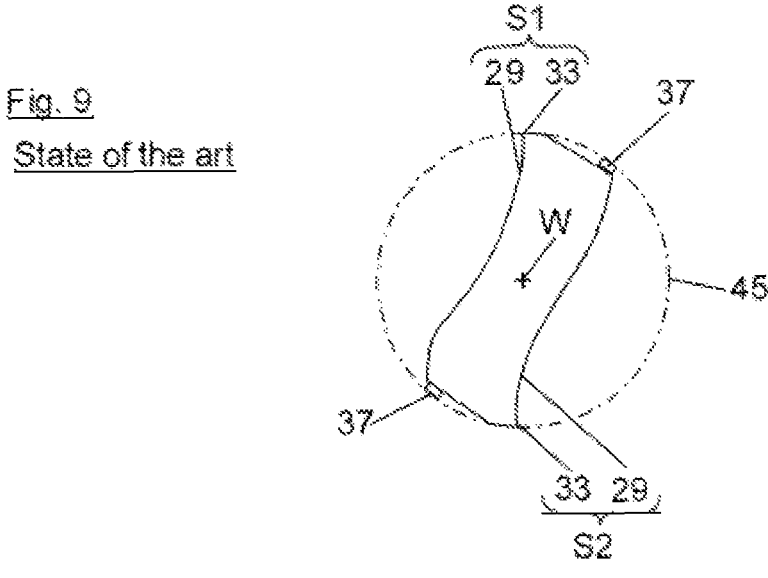
FIG. 9 is a view of a conventional drilling tool.
Figure 10:
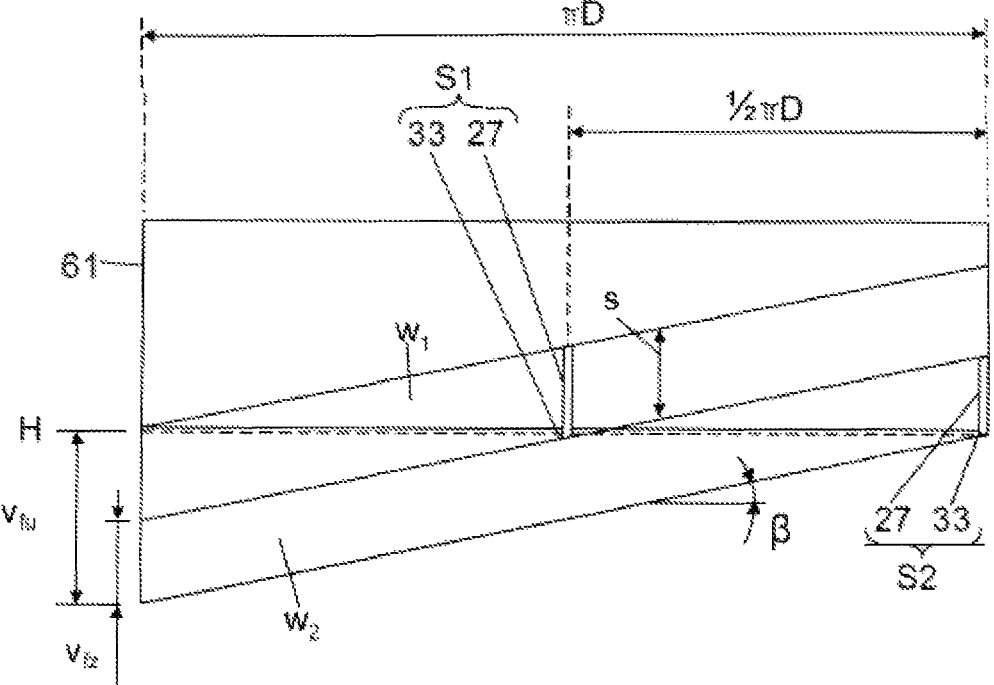
FIG. 10 is another view of a conventional drilling tool.
Figure 11:
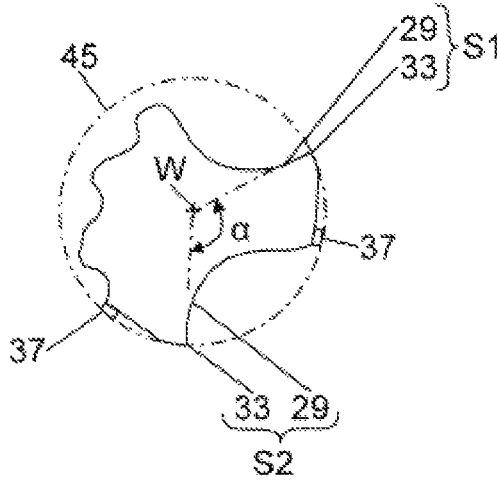
FIG. 11 is an embodiment of the invention.

The following description relates specifically to the drilling process step and the drilling section of the tapping tool: In general, when designing a drilling process step, the process parameters (i.e. speed n as well as feed rate $v_f$ of the drilling tool) must be coordinated with the positions of the drilling cutting edges S1, S2 on the drilling tool in such a way that the drilling cutting edge load per drilling cutting edge S1, S2 is approximately the same, i.e. the feed rate $v_{fz}$ (tooth feed rate) per drilling cutting edge S1, S2 is ideally the same. This is achieved in a conventional drilling tool (FIGS. 9 and 10) by constant pitch distances between the drilling cutting edges S1, S2. In FIG. 9, therefore, the drilling cutting edges S1, S2 are diametrically opposed with respect to the tool axis W, so that the feed rate (tooth feed rate) per drilling cutting edge S1, S2 is approximately the same, as shown in FIG. 10. In FIG. 10, the lateral surface of the conventional drilling tool is shown in a development. Accordingly, the drilling edges S1, S2 are positioned at the same axial height H.

In FIG. 10, the drilling cutting edges S1, S2 are each in chip engagement with the inner wall of a workpiece hole over identical cutting widths s. FIG. 10 shows the cutting paths $w_1$ and $w_2$ of the two drilling cutting edges S1, S2 resulting from the drilling process. The cutting paths $w_1$ and $w_2$ run spirally along the inner wall of the hole with a pitch angle β, so that a straight line of the cutting paths $w_1$ and $w_2$ results in the development (FIG. 10). The cutting paths $w_1$ and $w_2$ do not overlap in FIG. 10, but rather merge overlap-free in the axial direction.

Figure 12:
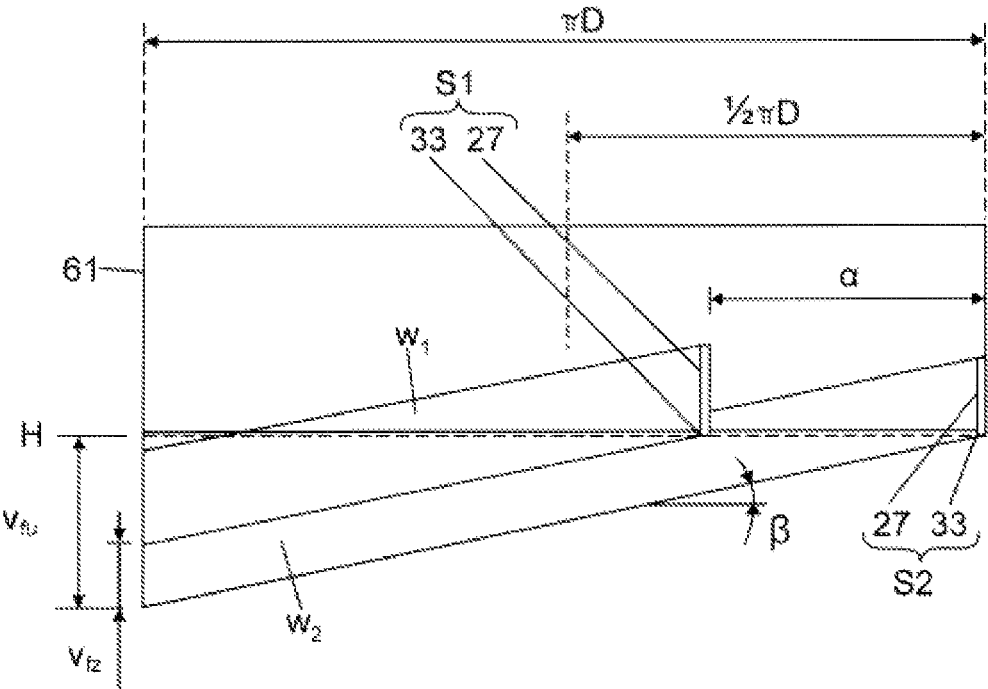
FIG. 12 is another embodiment of the invention.
Figure 15:
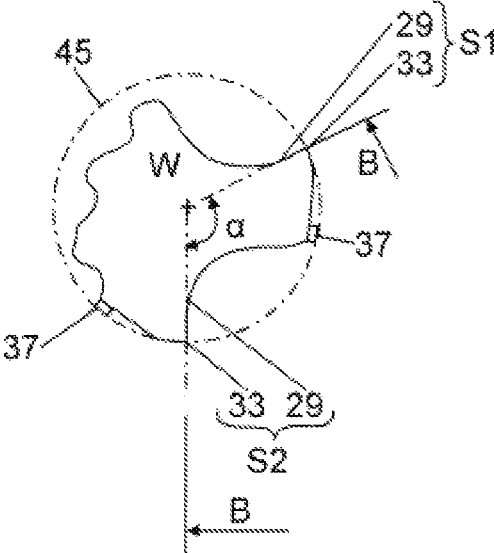
FIG. 15 is another exemplary embodiment of the invention.

In the embodiment example of FIGS. 11 to 14—in contrast to the prior art according to FIGS. 9 and 10—the pitch distances between the two drilling cutting edges S1, S2 are no longer identical, but different. Accordingly, in FIG. 12 the feed rate $f_{fz}$ per drilling cutting edge is no longer the same for each drilling cutting edge, but different. This means that in FIG. 12, the drilling cutting edges S1, S2 are no longer uniformly loaded in the drilling process, but are loaded differently. According to FIG. 12, the first drilling cutting edge S1 is assigned the largest feed rate $v_{fz}$ per drilling cutting edge, i.e. the first drilling cutting edge S1 is subjected to the greater cutting edge load. In FIG. 12, the two drilling cutting edges S1, S2 are positioned at the same height H without axial height offset H. According to FIGS. 13 and 14, each transverse cutting edge 29 of each drilling cutting edge S1, S2 spans a tip angle $\beta_1$, $\beta_2$ with the tool axis W. The point angles $\beta_1$, $\beta_2$ of the two drilling cutting edges S1, S2 are identically dimensioned in FIG. 14 (as in conventional drilling tools with symmetrical drilling cutting edge distribution). The tip angles $\beta_1$, $\beta_2$ are selected in such a way that the axial height offset $\Delta H$ at the tool circumference, i.e. at the cutting edge corners 33 of the two drilling edges S1, S2, or the different height positions H1, H2 of the drilling edges S1, S2 are set, as shown in FIG. 14.

In order to ensure an approximately uniform load on the drilling cutting edges S1, S2 despite the different pitch distances, the drilling cutting edges S1, S2 are no longer positioned at the same axial height H in the embodiment example of FIGS. 15 to 18, but rather are arranged at different height positions H1 and H2. These height positions H1 and H2 are selected in such a way that, compared to FIGS. 11 and 12, a more uniform drilling cutting edge loading of the two drilling cutting edges S1, S2 results. The height positions H1 and H2 are selected depending on the process parameters in the drilling process (i.e. tool speed, tool feed rate) and on the respective pitch distances.

Figure 16:
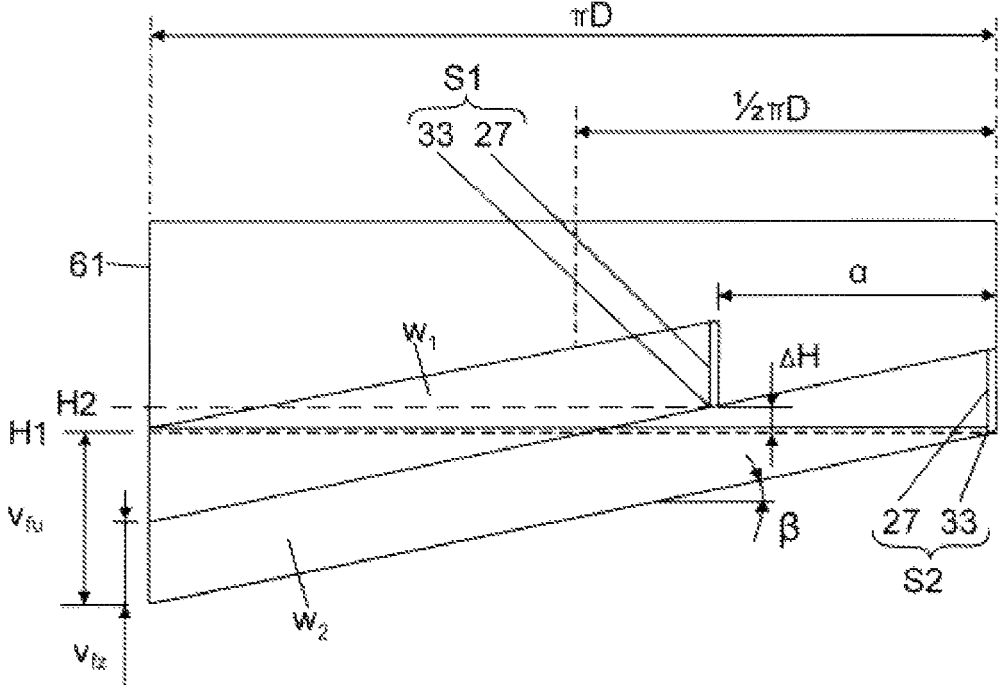
FIG. 16 is another exemplary embodiment of the invention.

As can be seen from FIG. 16, the drilling cutting edges S1, S2—analogous to FIGS. 9 and 10—are each in cutting engagement with the inner wall of the hole over identical cutting widths s. Furthermore, in FIG. 14, the cutting paths w₁ and w₂ do not overlap each other, but rather merge overlap-free.

Figure 17:
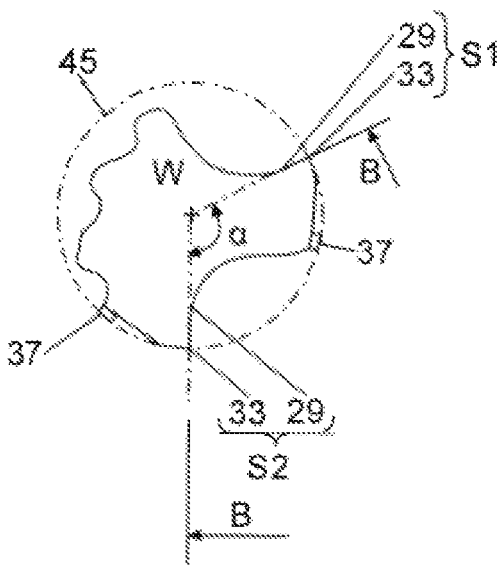
FIG. 17 is another exemplary embodiment of the invention.
Figure 18:
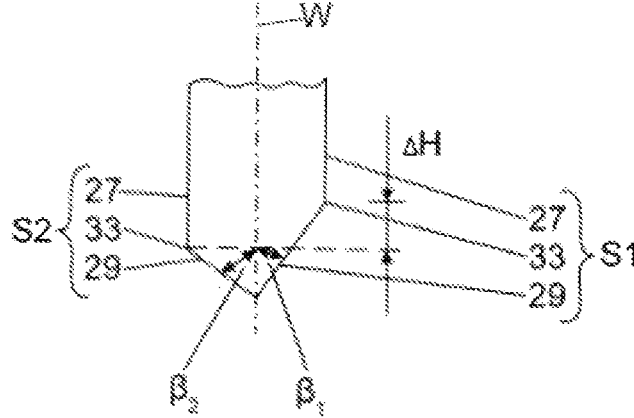
FIG. 18 is another exemplary embodiment of the invention.

According to FIGS. 17 and 18, each transverse cutting edge 29 of each drilling cutting edge S1, S2 spans a tip angle $\beta_1$, $\beta_2$ with the tool axis W. In FIG. 18, the tip angles $\beta_1$, $\beta_2$ of the two drilling edges S1, S2 are not identically dimensioned (as in conventional drilling tools with a symmetrical distribution of drilling edges), but rather are dimensioned differently from each other. The tip angles $\beta_1$, $\beta_2$ are selected in such a way that the axial height offset $\Delta H$ at the tool circumference, i.e. at the cutting edge corners 33 of the two drilling edges S1, S2, or the different height positions H1, H2 of the drilling edges S1, S2 are set, as shown in FIG. 16.

LIST OF REFERENCE SIGNS

1 Threaded hole
3 Hole reason
5 Workpiece
7 Thread counterbore
8 Chamfer
9 Internal thread
13 Circumferential free-cutting groove
14 Drill webs
15 Clamping shank
17 Tool body
14, 16 Drill webs
S1, S2 Drilling cutting edges
23 Chip space
25 Longitudinal cutting edge
29 Transverse cutting edge
30 End transverse free surface
33 Cutting edge corner
35 Drill web free surface
37 Guide chamfers
38 Direction of rotation in the drilling stroke
39 Tool thread generating section
40, 41, 42 Cutting teeth of the thread generating section
43 Alternative cutting tooth
44 Support base
45 Drilling cutting circular path
47 Envelope curve of the thread generating section 39
49 Tool clearance
51 Pilot hole
53 Circular path
$t_B$ Nominal drilling depth
$d_K$ Core diameter
u Tool circumferential direction
$\alpha$ Cutting edge angle
A Hole axis
W Tool axis
B Drilling stroke
G Tapping stroke
F Free-cutting stroke
V1, V2 Offset stroke $\Delta r_1$, $\Delta r_2$ Radial offset
$\Delta H$ Height offset
H1, H2 Height positions
$\beta_1$, $\beta_2$ Tip angle
$v_f$ Feed
$t_G$ Nominal thread depth

The invention claimed is:

1. A method for producing a workpiece threaded hole by a tapping tool, with a drilling stroke, comprising: driving a rotating tapping tool into a workpiece in a drilling direction to a nominal drilling depth, and so forming a thread-free pilot hole, and with a tapping stroke in which the tapping tool produces an internal thread in the pilot hole with a tapping feed rate and a tapping speed synchronized therewith, wherein for preparing the tapping stroke, a first reversing stroke takes place after the drilling stroke, in which the tapping tool is guided out of the pilot hole in a reversing direction opposite to the drilling direction to such an extent, wherein the tapping tool is radially displaced in an offset stroke by a radial offset, wherein in the tapping stroke, the radially controlled, rotating tapping tool is guided in a circular rotary motion along a circular path about a hole axis, and wherein, in the tapping stroke, the tool rotation and the tool circular motion take place in the same direction of rotary motion and at the same rotational speed;

wherein the tapping tool has a thread generating section;

wherein the thread generating section of the tapping tool has at least one, or several, thread teeth, and/or wherein each tooth lies on its own tooth contour diameter, wherein the allowance between two successive thread teeth is equal to the difference of the tooth contour diameters of the two successive thread teeth, and/or wherein a machining tooth lagging behind in a direction of rotation as the last machining tooth is a finishing tooth, a tooth contour diameter of which is larger than a tooth contour diameter of the preceding machining tooth, and/or wherein the thread teeth lie on an envelope curve; and wherein the tapping stroke and the drilling stroke have an identical stroke direction, and/or wherein during the tapping stroke, a thread generating section of the tapping tool generates the internal thread down to a nominal thread depth, and wherein the tapping stroke is extended by a free-cutting stroke when the nominal thread depth is reached, in which the feed and the speed of the tapping tool are no longer synchronized with one another and a circumferential free-cutting groove adjoining the internal thread and without thread pitch is produced.

2. The method according to claim 1, wherein, during the tapping stroke, the thread generating section of the tapping tool generates the internal thread down to a nominal thread depth, and, when the nominal thread depth is reached, the tapping stroke is extended by a free-cutting stroke in which the feed and the speed of the tapping tool are no longer synchronized with one another and a circumferential free-cutting groove adjoining the internal thread and without thread pitch is produced, and, after the free-cutting stroke has taken place, a second offset stroke takes place in preparation for a second reversing stroke, in which the tapping tool is moved free by a second radial offset in the radial direction from the internal thread or from the free-cutting groove, so that in the second reversing stroke the tapping tool can be guided out of the workpiece threaded hole without load, thread engagement or chip engagement.

3. The method according to claim 2, wherein, in the drilling stroke, a drilling section of the tapping tool is in chip engagement with the workpiece and the thread generating section is entrained without load, and/or wherein, in the tapping stroke, the thread generating section is in forming and/or cutting engagement with a pilot hole inner wall and the drilling section is entrained without load.

4. The method according to claim 1, wherein, in the drilling stroke, a drilling section of the tapping tool is in chip engagement with the workpiece and the thread generating section is entrained without load, and/or wherein, in the tapping stroke, the thread generating section is in forming and/or cutting engagement with a pilot hole inner wall and the drilling section is entrained without load.

5. The method according to claim 4, wherein the drilling section of the tapping tool has at least a first drilling cutting edge and a second drilling cutting edge which are spaced apart from one another in a tool circumferential direction by a cutting edge angle, and wherein the cutting edge angle is dimensioned such that the two drilling cutting edges can be introduced into the workpiece threaded hole in the tapping stroke without load and out of engagement with the internal thread produced.

6. The method according to claim 5, wherein the thread generating section is arranged in the tool circumferential direction outside a rotation angle range spanned by the two drilling cutting edges.

7. The method according to claim 5, wherein the first and second drilling cutting edges move on a common drilling cutting edge circular path with a drilling cutting edge diameter during a tool rotation, and wherein during the drilling stroke, the tool thread generating section moves on an outer diameter which is smaller than a pilot hole diameter.

8. The method according to claim 5, wherein the first and second drilling cutting edges are arranged in a tool axial direction in different height positions, with axial height offset relative to one another, and wherein the axial height offset between the drilling cutting edges is dimensioned in such a way that one or more drilling cutting edge loads per drilling cutting edge in the drilling stroke are approximately equal.

9. The method according to claim 8, wherein each drilling cutting edge has at least one end transverse cutting edge formed on the tool tip, and the transverse cutting edges of both drilling cutting edges are offset in height relative to one another in the tool axial direction by the axial height offset.

10. The method according to claim 9, wherein the transverse cutting edge of each drilling cutting edge at a radially outer cutting edge corner merges into a longitudinal cutting edge, and/or the drilling cutting edges are each formed on drill webs extending in a longitudinal direction of the tool, and the drill webs are spaced apart from one another in the tool circumferential direction via chip spaces, and/or a chip surface bounding the chip space merges at the longitudinal cutting edge into a peripheral drill web free surface, and/or guide chamfers project in each case from the peripheral drill web free surfaces, and/or the tool thread generating section is formed on the peripheral drill web free surface.

11. The method according to claim 10, wherein the transverse cutting edge of each drilling cutting edge spans a tip angle with a tool axis, and the tip angles of the drilling cutting edges are the same, or are different, wherein the tip angles are selected such that the axial height offset is set at the cutting edge corners of the drilling cutting edges.

12. The method according to claim 11, wherein at the tool tip a chip surface bounding the chip space merges at the end transverse cutting edge into an end free surface which tapers in the direction of the tool axis.

13. The method according to claim 1, wherein, in the drilling stroke, a tool axis (W) and the hole axis are coaxial to each other, and/or wherein in the tapping stroke, the tool axis and the hole axis are axially parallel to each other, the tool axis being radially offset from the hole axis by the radial offset.

14. The method according to claim 1, wherein a cutting geometry of the machining tooth is designed such that the machining tooth is drawn into the material of a pilot hole wall during the thread generation, whereby the tapping tool is subjected to a lateral deflection force, and wherein, for deflection force compensation, the tool thread generating section has at least one circumferentially arranged support base, the outer diameter of which lies approximately on a pilot hole diameter during the thread generation, so that during the thread generation the support base of the tapping tool is supported against the pilot hole wall.

15. The method according to claim 14, wherein, viewed in an axial direction, the at least one support base is formed in each case on both sides of the machining tooth.

16. The method according to claim 1, wherein the process steps for producing the threaded hole are carried out by a CNC control.

\* \* \* \* \*